(12) United States Patent
Blatz

(10) Patent No.: US 6,960,981 B2
(45) Date of Patent: Nov. 1, 2005

(54) DETECTING REDIRECTION DURING DATA TRANSMISSION

(75) Inventor: Werner Blatz, Leingarten (DE)

(73) Assignee: ATMEL Germany GmbH, Heilbronn (DE)

( * ) Notice: Subject to any disclaimer, the term of this patent is extended or adjusted under 35 U.S.C. 154(b) by 263 days.

(21) Appl. No.: 10/071,929

(22) Filed: Feb. 6, 2002

(65) Prior Publication Data

US 2002/0109581 A1    Aug. 15, 2002

(30) Foreign Application Priority Data

Feb. 14, 2001  (DE)  ................................ 101 06 736

(51) Int. Cl.[7] ............................................. G07C 9/00
(52) U.S. Cl. ...................................... 340/5.61; 340/10.4
(58) Field of Search ........................ 340/426.14, 426.16, 340/428, 5.3, 825.77, 426.1, 10.4, 5.61, 426.35; 307/10.2, 10.5; 455/436

(56) References Cited

U.S. PATENT DOCUMENTS

| | | |
|---|---|---|
| 4,157,454 A | 6/1979 | Becker |
| 4,672,375 A | 6/1987 | Mochida et al. |
| 4,783,658 A | 11/1988 | Nakano et al. |
| 4,973,958 A | 11/1990 | Hirano et al. |
| 5,579,373 A * | 11/1996 | Jang ............................ 455/436 |
| 5,600,726 A | 2/1997 | Morgan et al. |
| 5,724,428 A | 3/1998 | Rivest |
| 5,736,935 A | 4/1998 | Lambropoulos |

(Continued)

FOREIGN PATENT DOCUMENTS

| | | |
|---|---|---|
| DE | 4407966 | 9/1995 |
| DE | 19718764 | 8/1998 |
| DE | 19836957 | 9/1999 |
| DE | 19827722 | 12/1999 |
| DE | 10005503 | 8/2001 |
| EP | 0848123 | 6/1988 |
| WO | WO 90/09707 | 8/1990 |

OTHER PUBLICATIONS

Bosch, Robert, On-Board Electronics, Nov. 11, 2000, Bosch Pty. Ltd., RBAU/EGV001127, p. 11.*

K. S. Khangura et al.; "Vehicle anti-theft system uses radio frequency identification", IEEEColloquium on Vehicle Security Systems; Oct. 1993, pp. 4/1-4/7; Fig. 4 with description.

Ansaf Alrabady et al. "Some Attacks Against Vehicles' Passive Entry Security Systems and Their Solutions"; IEEE Transactions on Vehicular Technology, vol. 52, No. 2, Mar. 2003, pp. 431-439.

Primary Examiner—Edwin C. Holloway, III
(74) Attorney, Agent, or Firm—W. F. Fasse; W. G. Fasse

(57) ABSTRACT

In a method of detecting redirection or interception during a bi-directional non-contact making data transmission, the attenuation (A1) of the amplitude over the forward path is compared with the attenuation (A2) of the amplitude over the return path. The attenuation (A1) over the forward path is transmitted in encoded form with the reply signal. If the attenuation values determined thereby are of the same magnitude, then the likelihood of a redirecting process can be excluded. In order to additionally increase the security of the system, the carrier frequency (F2) of the interrogation signal can also be compared with the carrier frequency (F21) of the reply signal. The signals can also incorporate an ID code.

22 Claims, 3 Drawing Sheets

U.S. PATENT DOCUMENTS

| | | |
|---|---|---|
| 5,742,236 A | 4/1998 | Cremers et al. |
| 5,963,141 A | 10/1999 | Takamatsu |
| 6,140,914 A | 10/2000 | Mueller et al. |
| 6,208,239 B1 * | 3/2001 | Muller et al. .......... 340/426.35 |
| 6,218,932 B1 | 4/2001 | Stippler |
| 6,483,425 B1 * | 11/2002 | Avenel ..................... 340/5.61 |
| 6,747,545 B2 * | 6/2004 | Nowottnick et al. ....... 340/5.61 |
| 2001/0014117 A1 | 8/2001 | Blatz et al. |

* cited by examiner

DETECTING REDIRECTION DURING DATA TRANSMISSION

BACKGROUND

1. Field of the Invention

The present invention relates to detecting redirection or interception of data and in particular to a method of detecting a redirecting process in the course of a bi-directional non-contact making transmission of data.

2. Description of the Related Technology

Systems for the bi-directional non-contact making transmission of data are preferably used in identification systems. In general, these systems consist of a base station and a transponder. These systems are utilised for authentication purposes in the field of motor cars, a main field of usage. In order to achieve a high level of security for the authentication process, the distance over which the communication can take place is restricted to just a few meters in the case of a so-called "passive entry" system, i.e. the opening of a vehicle by pulling the door handle. In an identification system, it is important that the time required for the authentication process be kept short. The total time for the authentication process in the field of motor vehicles is generally between 50 and 130 msec. In order to prevent unauthorised authentication by means of a redirecting process for example, methods have been developed for detecting the manipulation and for terminating the authentication process should this be necessary.

A first method of detecting redirection or interception during an authentication process is known from German patent document DE 10005503, wherein at least one characteristic parameter of the transmitted electromagnetic wave is altered in reversible manner. To this end, a reply signal, which, for example, has been altered in frequency relative to the interrogation signal in a second transmitting and receiving unit (a transponder), is transmitted back to the first transmitting and receiving unit.

In the first transmitting and receiving unit (the base station), the frequency of the reply signal is changed back again and compared with the frequency of the originally transmitted interrogation signal. If the value detected thereby lies within a pre-defined interval, one can virtually exclude the possibility that redirection has occurred.

Another method of detecting redirection in the course of an authentication process is known from German patent document DE 198 27 722. In order to prevent unauthorised opening of a motor vehicle, the power of the transmitted interrogation signal and that of the reply signal are bit-modulated. The mask used for the modulation process is produced by means of a secret key which is known to both the base station and the transponder. A maximum permissible time period is laid down, this being based on the assumption that the modulation of the transmitted power would have to be evaluated in the event of a redirecting process and that an additional time delay would thereby ensue between the transmission of the interrogation signal and the reception of the reply signal. If the time difference between the interrogation and the reply signals is greater than the redefined minimum time, then it is assumed that redirection has occurred and the authentication process is terminated.

The disadvantage of the previous methods is that redirection is not impeded or is not made difficult enough when using the previous methods. It is true that the reversible alteration of the frequency makes the frequency conversion process that is generally carried out during a redirecting process more difficult, but the degree of difficulty involved is determined only by the precision of the frequency conversion process within the redirecting device. Insofar as it is possible to effect a high precision conversion and re-conversion of the frequency in the redirecting devices, then an authentication process can be carried out and unauthorised access to a motor vehicle for example can be obtained. In the case of the other known method, which attempts to detect redirection by encoding the modulation of the transmitter power, this can already be done by the currently known devices (transceivers) that are used for redirecting purposes. Thus the known transceivers compensate for the additional attenuation losses, which are caused by the greater length of the signal path during the redirecting process, by subjecting the signals to linear amplification without thereby altering the relative modulation of the transmitter power. However, as the modulation of the transmitter power does not have to be decoded, the time loss postulated by the method does not occur and redirection cannot be detected. Neither of the two methods offers sufficient protection from unauthorised access within an authentication process.

SUMMARY OF THE INVENTION

Aspects of the present invention seek to provide a method which detects a redirection of the signals.

According to the present invention, there is provided a method of detecting a redirecting process in the course of a bi-directional non-contact making transmission of data between a first transmitting and receiving unit and a second transmitting and receiving unit wherein the first transmitting and receiving unit transmits an interrogation signal, the value of the amplitude (A1) of the received interrogation signal is measured by the second transmitting and receiving unit, the measured value of the amplitude (A1) is transmitted back in a reply signal, and the value of the amplitude (A2) of the received reply signal is measured by the first transmitting and receiving unit and compared with the returned value of the amplitude (A1).

In embodiments of the present invention, in the course of a bi-directional non-contact making transmission of data, it is determined as to whether a redirecting process is taking place by means of a comparison of the attenuation characteristics of the transmission paths between a first transmitting and receiving unit and a second transmitting and receiving unit. To this end, the interrogation signal transmitted by the first transmitting and receiving unit is measured in regard to the amplitude thereof in the second transmitting and receiving unit.

The measured amplitude value is transmitted back to the first transmitting and receiving unit in a reply signal, preferably, in encoded form. Furthermore, the amplitude of the received reply signal is determined in the first transmitting and receiving unit and is compared with the returned value of the amplitude, whereafter a value is assigned to a redirection indicator in dependence upon the comparison. One can exclude the possibility that a redirecting process is occurring, if the result of the comparison of the amplitude values falls within a predefined interval.

Methods in accordance with the present invention are based upon the principle that in the case of a communication process not subjected to redirection, the transmission path will be symmetrical in regard to the attenuating behaviour thereof, i.e. both the forward path and the return path will have the same attenuation characteristics since the two transmitting and receiving units utilise a single respective antenna for the transmission and reception of signals. If the signals are prolonged by means of a redirecting device, then the redirecting device is utilising different antennae for transmitting and receiving purposes and is amplifying the signals in order to compensate for the additional attenuation caused by the redirecting device. Differing coupling factors between the antennae in the transmitting and receiving units and those in the redirecting device are associated with the different antennae used for transmitting and receiving purposes in the redirecting device, these differing coupling factors removing the symmetry of the transmission paths and heavily attenuating, in different manners, the amplitude of the interrogation signal in comparison with the amplitude of the reply signal.

In a further development of the method, the information regarding the attenuating characteristics of the signal path, which can be extrapolated from the measured value of the amplitude, is protected from unauthorised access. To this end, the digitalised value of the amplitude is inserted into the reply signal in encoded form. For an authentication process in which the authorisation is checked by examining encoded ID codes, the value of the amplitude could be coded using the same key as that with which the ID code of the respective transmitting and receiving unit was encoded prior to the transmission. By virtue of such an encoding process, it becomes impossible to evaluate the attenuation information using justifiable resources.

In another embodiment of the method, the comparison of the amplitudes is carried out within a predefined time window, whereby a check can be made as to whether the reply signal immediately follows the interrogation signal in time. Consequently, any change in position of either of the two transmitting and receiving units during the communication process between the first transmitting and receiving unit and the second transmitting and receiving unit will be prevented from removing the symmetry of the transmission path but a suspected redirecting process will be indicated by means of the resultant differing attenuations of the amplitudes. Furthermore, a redirecting device will be prevented from compensating for the asymmetry of the attenuation characteristics by trying to repeatedly change its signal amplification factor.

In another embodiment of the method, redirection is detected by comparing the frequency of the interrogation signal with the frequency of the reply signal, this being done in addition to the comparison of the amplitudes made by the first transmitting and receiving unit. In order to make the interval used for the frequency comparison as small as possible, it is advantageous if the second transmitting and receiving unit carries out a frequency coupling process with the frequency of the interrogation signal transmitted by the first transmitting and receiving unit. The carrier frequency can thereby be regenerated for the purposes of modulating the data in the reply signal. Since the frequency of the reply signal and that of the carrier signal are identical, the smallest deviations of the carrier frequency can be detected. A process of redirecting at the same frequency is thereby made extremely difficult since the functioning of the redirecting device will be adversely affected due to feedback. A frequency conversion process effected by the redirecting device within the redirection path leads to the carrier frequency being subjected to a frequency off-set. Should the result of the frequency comparison lie within the predefined interval, then it is possible to exclude the likelihood of a redirecting process.

In another embodiment of the method, the first transmitting and receiving unit also checks, in addition to the comparison made in respect of the amplitudes and the frequencies, as to whether the carrier signal remains uninterrupted, apart from field-gaps during the transmission of the interrogation signal, until the reception of the reply signal. Consequently, it is extremely difficult for a redirecting device to convert the carrier frequency for the purposes of redirecting the transmission without this being detected by the first transmitting and receiving unit. Amplification of the signals, which would compensate for the additional attenuation caused by the lengthening of the signal path, has to be effected at the frequency of the carrier by the redirecting device. In so doing however, the redirecting device can only compensate for the additional attenuation losses insofar as the signal amplification factor thereof remains smaller than the value of the decoupling between its transmitting and receiving antennae. On the other hand, if the circuit amplification factor within the redirecting device is greater than one, then this would result in feedback so that the functioning of the redirecting device would be extremely badly affected.

Experiments made by the applicant have shown that it is advantageous if a comparison of the amplitude values and a comparison of the frequencies is effected within an authentication process whilst checking the authorisation by means of an ID code. Thus, these methods do not require any additional time for detecting a redirecting process and can be employed, to advantage, for applications in the field of motor vehicles. Moreover, in applications in the motor vehicle field, the time span of 50–130 msec allowed for the authentication process is too short, except at intolerable expense, for decoding the amplitude values which are transmitted back with the reply signal, or, for compensating for the differing attenuation characteristics on the forward and return paths by means of some other method. Consequently, the possibility of unauthorised authentication by means of a redirecting process can be reliably excluded.

BRIEF DESCRIPTION OF THE FIGURES

Preferred embodiments of the present invention will now be described, by way of example only, with reference to the accompanying drawings, of which.

DESCRIPTION OF THE PREFERRED EMBODIMENTS

Figure 1:
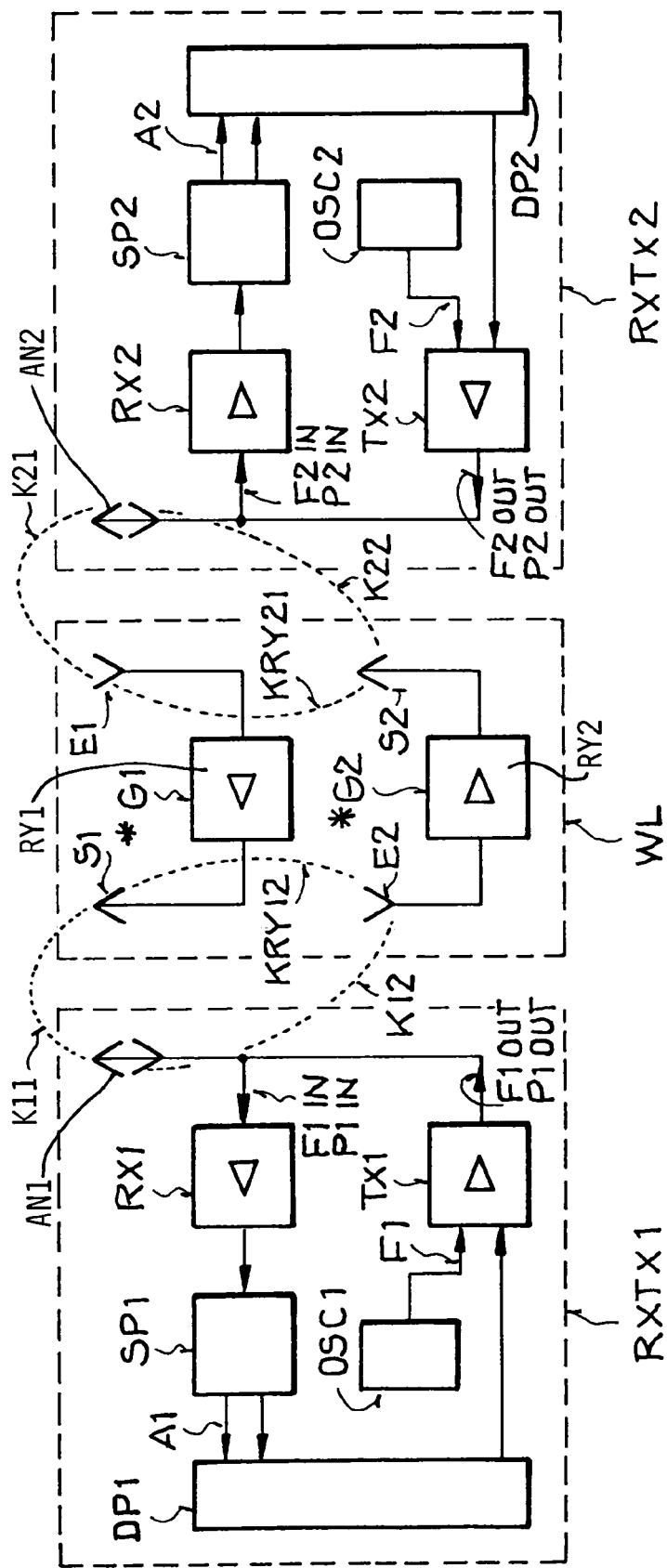
FIG. 1 shows an embodiment of the invention in the form of a method for determining the attenuation of the amplitudes in a bi-directional data transmission system involving a redirecting process.

The purpose of the embodiment depicted in FIG. 1 is to detect redirection or interception of data during an exchange of data between a first transmitting and receiving unit and a second transmitting and receiving unit by making a comparison between the attenuation of the amplitudes on the forward path and the return path. An arrangement of this type can be employed for authentication purposes in systems in the motor vehicle field for example, so as to detect a redirecting process. The system illustrated consists of a first sending and receiving unit RXTX2 which will be referred to hereinafter as the base station, a second transmitting and receiving unit RXTX1 which will be referred to hereinafter as the transponder. Moreover, there is also depicted a redirecting device WL which lengthens the communication paths between the base station RXTX2 and the transponder RXTX1. The communication path from the base station to the transponder will be referred to as the UPLINK, whereas the reverse communication path will be referred to as the DOWNLINK. The construction of the individual devices will now be explained.

The base station RXTX2 consists of an oscillator unit OSC2 which produces a carrier frequency F2 that is used for modulation purposes in an output amplifier TX2. Using the data delivered by a data processing unit DP2, the output amplifier TX2 produces a modulated output signal F2OUT which is transmitted in the form of an interrogation signal having the power P2OUT by means of a transmitting and receiving antenna AN2. Furthermore, the transmitting and receiving antenna AN2 is connected to an input amplifier RX2 so as to amplify an incoming input signal F2IN having an input power P2IN and pass it on to a signal processor SP2. The signal processor SP2 measures the magnitude of the amplitude of the input signal F2IN and passes the measured value A2 to the data processing unit DP2. Furthermore, the signal processor SP2 demodulates the input signal F2IN and passes on the data recovered from the carrier signal to the data processing unit DP2.

As regards the lengthening of the UPLINK communication path by the redirecting device WL, the interrogation signal transmitted by the base station RXTX2 is passed on from a first receiving antenna E1 to an amplifier RY1 which then retransmits this interrogation signal that has been amplified by the factor G1 by means of a first transmitting antenna S1. As regards the lengthening of the DOWNLINK communication path by the redirecting device WL, a reply signal transmitted by the transponder RXTX1 is passed on from a second receiving antenna E2 to a second amplifier RY2 which then retransmits the reply signal that has been amplified by the factor G2 from a second transmitting antenna S2.

The transponder RXTX1 consists of an oscillator unit OSC1 which produces a carrier frequency F1 that is used for modulation purposes in an output amplifier TX1. Using the data delivered by a data processing unit DP1, the output amplifier TX1 produces a modulated output signal F1OUT which is transmitted in the form of a reply signal having the transmission power P1OUT by means of a transmitting and receiving antenna AN1. Furthermore, the transmitting and receiving antenna AN1 is connected to an input amplifier RX1 so as to amplify an incoming input signal F1IN having a reception power P1IN and pass it on to a signal processor SP1. The signal processor SP1 measures the magnitude of the amplitude of the input signal F1IN and passes on the measured value A1 to the data processing unit DP1. Furthermore, the signal processor SP1 demodulates the input signal F1IN and passes on the data derived from the carrier signal to the data processing unit DP1.

For the UPLINK, the magnitude of the attenuation between the base station RXTX2 and the redirecting device WL is defined by a coupling factor K21, and the attenuation between the redirecting device and the transponder is defined by a coupling factor K11. In a corresponding manner for the DOWNLINK, the attenuation between the transponder RXTX1 and the redirecting device WL is defined by a coupling factor K12, and the attenuation between the redirecting device WL and the base station RXTX2 is defined by a coupling factor K22. Furthermore, the coupling between the antennae E1 and S2 is defined by a factor KRY21, and the coupling between the antennae S1 and E2 is defined by a factor KRY12.

The manner in which the arrangement functions will now be explained. In the UPLINK, the communication path is lengthened by the redirecting device WL, in that the redirecting device WL receives an interrogation signal transmitted by the base station RXTX2 and, after amplification, retransmits it. The interrogation signal is demodulated by the transponder RXTX1 and the measured value of the amplitude A1 of the interrogation signal is retransmitted in the form of data in a reply signal for the DOWNLINK. Then, in the DOWNLINK, the communication path is lengthened by the redirecting device WL, in that the received reply signal is amplified and transmitted to the base station RXTX2. The base station RXTX2 demodulates the received reply signal and compares the value of the amplitude A1 that has been retransmitted with the reply signal with the measured value of the amplitude A2 of the reply signal in the data processing unit DP2. If the two values of the measured amplitudes differ, then a digit 1 is stored in an internal memory by the data processing unit DP2, and an indication is given that redirection has occurred. If the result of the comparison falls within a predefined interval, then the digit zero is stored in the memory to show that it can be concluded that a redirecting process has not occurred.

In the case of a predefined transmitting power P2OUT and P1OUT and a predefined amplification of the input signals P2IN and P1IN by the base station RXTX2 and the transponder RXTX1, the values A1 and A2 of the amplitudes of the interrogation signal and the reply signal are dependent on the coupling factors for the UPLINK and the DOWNLINK and upon the amplification factors G1 and G2 in the redirecting device WL. In the present example, the following relationship applies for a coupling factor KUL in the case of redirection in the UPLINK:

$$KUL = K21 + G1 + K11$$

and a coupling factor KDL for the DOWNLINK is given by:

$$KDL = K12 + G2 + K22$$

As a result of the asymmetry between the transmission paths in the UPLINK and the DOWNLINK, the two coupling factors KDL and KUL and the attenuation of the amplitudes A1 and A2 are different. In contrast thereto, the transmission path will exhibit a symmetrical attenuation characteristic if the redirecting device should be removed from the communication path. In this case, the following relationship exists for the two coupling factors KDL and KUL in the UPLINK and the DOWNLINK:

$$KDL = KUL$$

Furthermore, due to the additional coupling factors and the free space attenuation included therein, the attenuation of the amplitudes will be greater in the event of redirection than would be the case without redirection. Based on the difference in the attenuation characteristics when the redirecting device WL is present compared with the case when the redirecting device WL is absent, a reliable method of detecting redirection is obtained by the process of comparing the amplitudes A1 and A2. This also applies in the case where the redirecting device WL attempts to compensate for the asymmetry of the attenuation characteristic by means of the amplification processes G1 and G2 since, without undue expenditure, this cannot be carried out without knowledge of the distances involved in the communication or knowledge of the coupling factors K11 to K22. Insofar as the redirecting device WL effects amplification of the amplitudes A1 and A2 on the carrier frequency F1, the coupling factors KRY12 and KRY21 determine the maximum permissible degree of amplification G1 and G2. In order to prevent oscillations occurring in the redirecting device WL due to feedback, the circuit amplification factor of the redirecting device must remain below 1.

Figure 2:
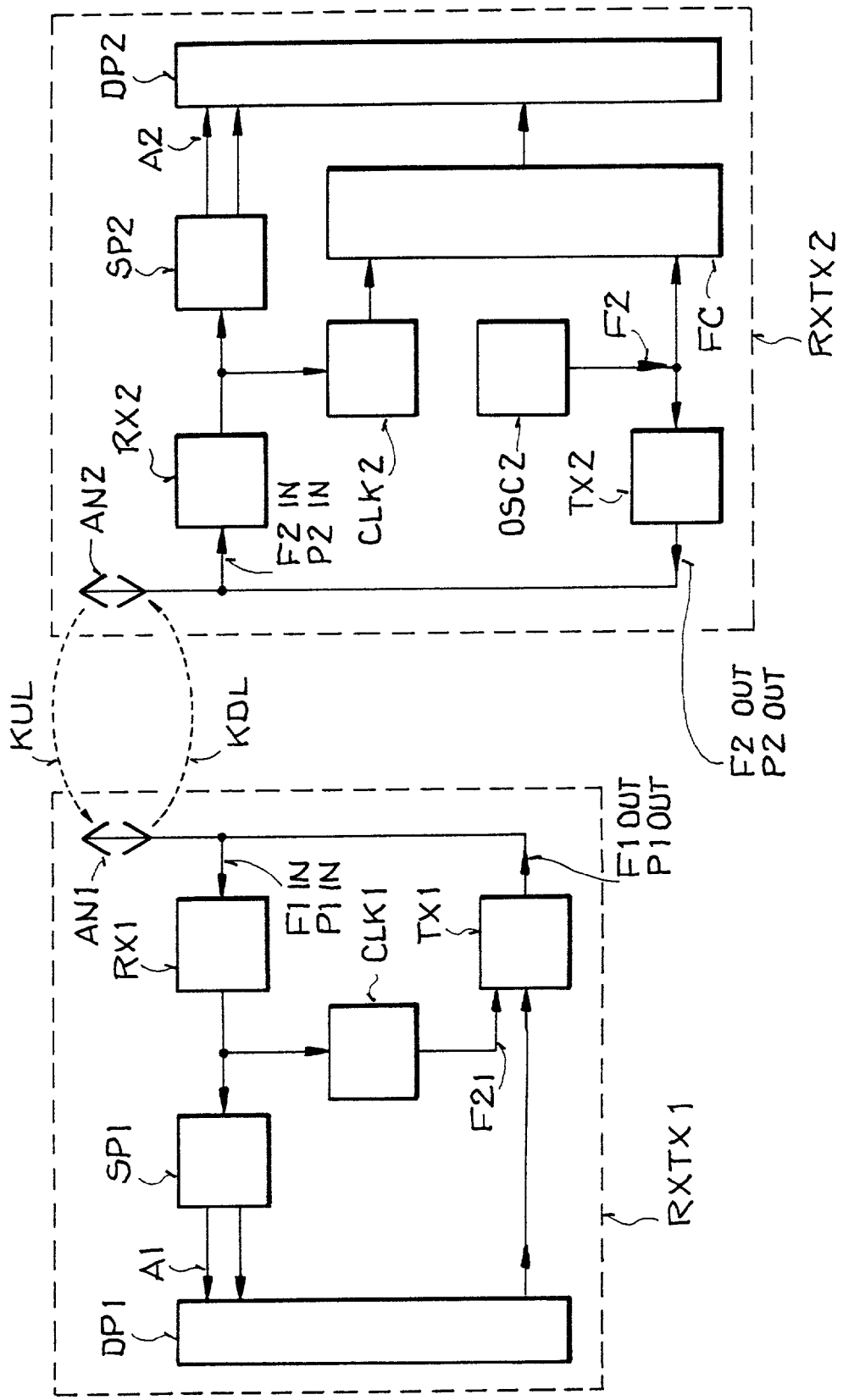
FIG. 2 shows an embodiment of the invention in the form of a method for determining the attenuation of the amplitudes whilst simultaneously comparing the carrier frequencies when there is no redirection.

In a further embodiment which is illustrated in FIG. 2, a comparison of the carrier frequencies of the interrogation signal and the reply signal is carried out in addition to the comparison of the amplitudes that has already been described with reference to FIG. 1 in the case of communication between the base station RXTX2 and the transponder RXTX1. Accordingly, the functional construction of the base station RXTX2 and the transponder RXTX1 described hereinafter is identical, except for the aforesaid extension, with the functions illustrated in FIG. 1. Furthermore, in the embodiment illustrated, the communication between the base station RXTX2 and the transponder RXTX1 is effected without a redirecting process being involved, so that the coupling factor KUL for the UPLINK is identical to the coupling factor KDL for the DOWNLINK. A preferred utilisation of the embodiment within an authentication process will be explained in conjunction with the explanations given in connection with FIG. 3.

Within the base station RXTX2, the carrier signal F2 produced by the oscillator OSC2 is additionally supplied to a frequency comparison unit FC, the output of which is connected to the data processing unit DP2. Furthermore, the reply signal, which has been amplified by the receiving amplifier RX2 and whose carrier has been regenerated by means of a unit CLK2, is supplied to the frequency comparison unit FC. The oscillator unit OSC1 is replaced by a unit CLK1 in the transponder RXTX1. The reply signal amplified by the input amplifier RX1 is supplied to the unit CLK1 for the purposes of regenerating the carrier. Following the regeneration process, the carrier is supplied at a frequency F21 to the output amplifier TX1 for a fresh modulation process whereafter it is transmitted.

The manner in which the arrangement functions will now be explained. At the beginning of the transmission of the interrogation signal, the unmodulated carrier signal F2 is supplied to the frequency comparison unit FC. As soon as the transponder RXTX1 receives the interrogation signal, an unmodulated carrier having the frequency F21 is obtained by regenerating the carrier signal with the aid of the unit CLK1, and this is then supplied to the transmitting amplifier TX1 for a fresh modulation process and retransmission to the base station RXTX2 in the form of a reply signal. A rigid frequency coupling process is thereby carried out. As soon as the reply signal has been received in the base station RXTX2, the carrier having the frequency F21, which is derived from the reply signal by the unit CLK2, is supplied to the frequency comparison unit FC for the purposes of comparing the frequencies of the interrogation signal and the reply signal. Consequently the frequency F2 of the oscillator unit OSC2 and the frequency F21 obtained from the reply signal are applied to the unit FC. The frequency comparison unit FC will supply a signal to the data processing unit DP2 insofar as the two frequencies are equal. If the evaluation of the amplitudes that was carried out simultaneously by the data processing unit DP2 also results in the two values of the amplitudes A1 and A2 being equal then one can exclude the possibility of a redirecting process.

Figure 3:
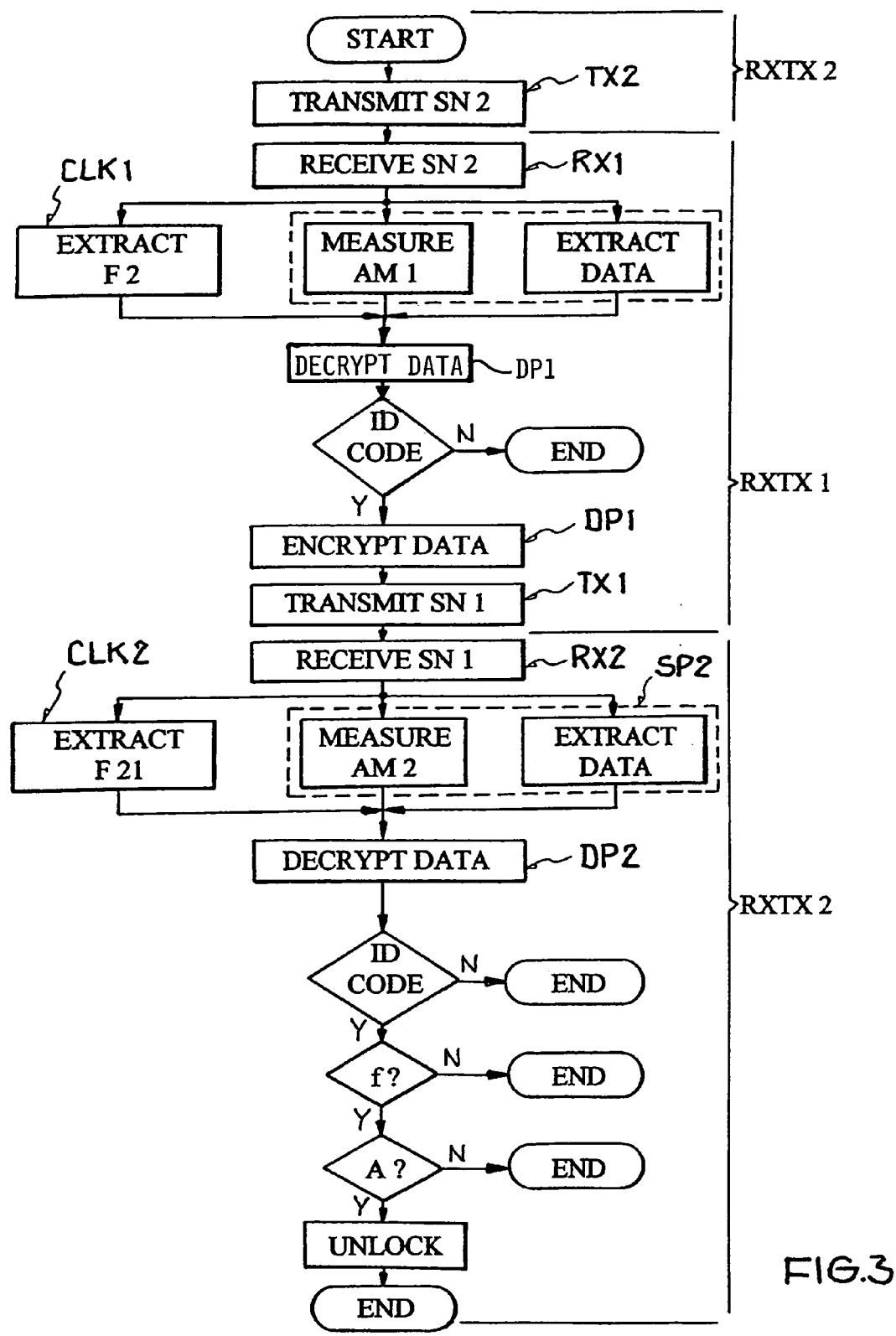
FIG. 3 shows a flow diagram for the authentication process in conjunction with the embodiment illustrated in FIG. 2.

The flow diagram for an authentication process based on the embodiment illustrated in FIG. 2 will be described in connection with FIG. 3.

Following the start of the authentication process, by actuating the door handle of a vehicle for example, the output amplifier TX2 in the base station RXTX2 transmits an interrogation signal SN2, which preferably incorporates encoded data, during a first process step TRANSMIT SN2. In a succeeding process step RECEIVE SN2, the interrogation signal is amplified by the input amplifier RX1 in the transponder RXTX1 and it is then passed on. Whilst the unit CLK1 derives the carrier from the interrogation signal in a process step EXTRACT F2, the value of the amplitude A1 is measured and the data is separated from the carrier within the signal processing unit SP1 in the course of the process steps MEASURE AM1 and EXTRACT DATA which run in parallel. In a following process step DECRYPT DATA, the data is decoded and is then checked for agreement with an internally stored code in a query step ID-CODE. If the ID code is not valid, the authentication process comes to an end and a reply signal will not be sent back. If the ID code is valid then the measured value of the amplitude A1 is encoded in a following process step ENCRYPT, whereafter it is retransmitted in the form of a reply signal by the output amplifier TX1 in the course of a succeeding process step TRANSMIT SN1. Following the reception of the reply signal in the base-station RXTX2, which is characterised by the process step RECEIVE SN1, the value of the amplitude A2 is measured and the data is separated from the carrier within the signal processing unit SP2 during the process steps MEASURE AM2 and EXTRACT DATA which run in parallel simultaneously with a process step EXTRACT F21 in which the unit CLK2 regenerates the carrier for the frequency comparison process. In a succeeding process step DECRYPT DATA, the data is decoded and a check is made during a query step ID-CODE as to whether the retransmitted ID code matches an internally stored code. If the ID code is not valid, the authentication process comes to an end. If the ID code is valid, it is checked in the two succeeding query steps F? and A? as to whether the frequency F2 matches the frequency F21 and as to whether the ratio of the amplitudes A1 and A2 matches a predetermined value. If the result of one of these queries is negative then the authentication process comes to an end. If the result of both queries is positive, then the authentication process has been successfully completed i.e. the doors of the vehicle are unlocked in a succeeding process step UNLOCK.

It will be understood that the above description of the present invention is susceptible to various modifications, changes and adaptations.

What is claimed is:

1. A method of detecting a redirecting process in the course of a bi-directional non-contact making transmission of data between a first transmitting and receiving unit and a second transmitting and receiving unit wherein the first transmitting and receiving unit transmits an interrogation signal, the value of the amplitude (A1) of the received interrogation signal is measured by the second transmitting and receiving unit, the measured value of the amplitude (A1) is transmitted back in a reply signal, and the value of the amplitude (A2) of the received reply signal is measured by the first transmitting and receiving unit and compared with the returned value of the amplitude (A1).

2. A method in accordance with claim 1, wherein a predetermined value is assigned to a redirection indicator in dependence on the result of the comparison.

3. A method in accordance with claim 1, wherein the measured value (A1) of the amplitude is transmitted in encoded form with the reply signal.

4. A method in accordance with claim 3, wherein the comparison is carried out within a predefined time window which begins at the beginning of the transmission of the interrogation signal.

5. A method in accordance with claim 1, wherein the first transmitting and receiving unit additionally compares the frequency (F2) of the interrogation signal with the frequency (F21) of the reply signal.

6. A method in accordance with claim 5, wherein a check is made by the first transmitting and receiving unit as to whether the carrier frequency is present, without interruption, from the transmission of the interrogation signal until the reception of the reply signal.

7. A method in accordance with claim 5, wherein the comparison of the amplitude values (A1, A2) and the comparison of the frequencies (F1, F21) is carried out simultaneously with the checking of an identification code.

8. The use of the method in accordance with claim 1, for detecting unauthorized redirection of an authentication process employed in motor vehicles.

9. A method of bi-directional data transmission between two transmitting and receiving units including a first unit and a second unit, said method comprising the steps:
   a) transmitting a forward signal from said first unit;
   b) receiving said forward signal by said second unit;
   c) in said second unit, measuring a received forward amplitude of said forward signal as received by said second unit;
   d) transmitting, from said second unit, a return signal containing information representing said received forward amplitude;
   e) receiving said return signal including said information by said first unit;
   f) in said first unit, measuring a received return amplitude of said return signal as received by said first unit; and
   g) comparing said return amplitude with said forward amplitude to determine any difference therebetween.

10. The method according to claim 9, further comprising permitting said data transmission to continue if said difference is zero or has a magnitude below a defined threshold.

11. The method according to claim 9, further comprising providing an authorization signal to allow access to a motor vehicle only if said difference is zero or has a magnitude below a defined threshold.

12. The method according to claim 9, wherein said return signal further contains an identification code, and wherein said method further comprises comparing said identification code with an expected value, and providing an authorization signal only if said identification code matches said expected value and said difference is zero or has a magnitude below a defined threshold.

13. The method according to claim 12, further comprising unlocking a lock of a motor vehicle in response to said authorization signal.

14. The method according to claim 9, wherein said information represents said received forward amplitude in encoded form.

15. The method according to claim 9, wherein said forward signal has a forward signal frequency, said return signal has a return signal frequency, and said method further comprises comparing said return signal frequency with said forward signal frequency to determine any frequency difference therebetween.

16. The method according to claim 15, further comprising providing an authorization signal to allow access to a motor vehicle only if said frequency difference is zero.

17. The method according to claim 9, wherein said forward signal and said return signal both have the same frequency.

18. The method according to claim 9, further comprising checking, in said first unit, whether a carrier frequency of said forward signal remains continuously present without interruption from said transmitting of said forward signal until said receiving of said return signal.

19. The method according to claim 9, wherein said transmitting and receiving by said first unit are both carried out via a single first unit antenna, and said transmitting and receiving by said second unit are both carried out via a single second unit antenna.

20. A system for bi-directional data transmission between two transmitting and receiving units including a first unit and a second unit, wherein:
   said first unit comprises a first antenna, a first data processor, a first transmitting amplifier connected between an output of said first data processor and an input of said first antenna, a first receiving amplifier having an input connected to an output of said first antenna, and a first signal processor that has an input connected to an output of said first receiving amplifier and has an output connected to an input of said first data processor, and that is adapted to measure a first received amplitude of a first signal received via said first antenna and said first receiving amplifier; and
   said second unit comprises: a second antenna; a second data processor; a second transmitting amplifier connected between an output of said second data processor and an input of said second antenna; a second receiving amplifier having an input connected to an output of said second antenna; and a second signal processor that has an input connected to an output of said second receiving amplifier and has an output connected to an input of said second data processor, and that is adapted to measure a second received amplitude of a second signal received via said second antenna and said second receiving amplifier;
   wherein said second data processor is adapted to provide information representing said second received amplitude to said second transmitting amplifier to be transmitted by said second transmitting amplifier via said second antenna in said first signal; and
   wherein said first data processor is adapted to receive said information in said first signal and to compare said second received amplitude with said first received amplitude and provide a signal in response to and dependent on any difference therebetween.

21. The system according to claim 20, wherein said signal dependent on said difference indicates whether a redirection of at least one of said first signal between said second unit and said first unit or said second signal between said first unit and said second unit has occurred.

22. The method according to claim 9, further comprising a step of determining, based on a result of said comparing in said step g), whether a redirection of at least one of said forward signal between said first unit and said second unit or said return signal between said second unit and said first unit has occurred.

* * * * *